(12) United States Patent
Tibah (10) Patent No.: US 12,054,608 B2
(45) Date of Patent: *Aug. 6, 2024

(54) POLYVINYL ESTER FORMULATIONS, METHODS OF MAKING THE SAME ROOFING MATERIALS AND ROOFING SYSTEMS INCLUDING THE SAME

(71) Applicant: BMIC LLC, Dallas, TX (US)

(72) Inventor: Denis Tibah, Waxahachie, TX (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,864

(22) Filed: Apr. 10, 2023

(65) Prior Publication Data

US 2023/0250273 A1    Aug. 10, 2023

Related U.S. Application Data

(63) Continuation of application No. 17/577,928, filed on Jan. 18, 2022, now Pat. No. 11,649,350.

(60) Provisional application No. 63/139,058, filed on Jan. 19, 2021.

(51) Int. Cl.
| | |
|---|---|
| *C08L 61/00* | (2006.01) |
| *B32B 5/02* | (2006.01) |
| *B32B 27/12* | (2006.01) |
| *B32B 27/20* | (2006.01) |
| *B32B 27/30* | (2006.01) |
| *C08G 4/00* | (2006.01) |
| *C08K 3/36* | (2006.01) |
| *E04D 1/22* | (2006.01) |
| *E04D 3/18* | (2006.01) |
| *E04D 5/08* | (2006.01) |
| *E04D 7/00* | (2006.01) |

(52) U.S. Cl.
CPC .............. *C08L 61/00* (2013.01); *B32B 5/028* (2013.01); *B32B 27/12* (2013.01); *B32B 27/20* (2013.01); *B32B 27/30* (2013.01); *C08G 4/00* (2013.01); *C08K 3/36* (2013.01); *B32B 2262/101* (2013.01); *B32B 2307/54* (2013.01); *B32B 2419/06* (2013.01); *C08L 2555/40* (2013.01); *E04D 1/22* (2013.01); *E04D 3/18* (2013.01); *E04D 5/08* (2013.01); *E04D 7/00* (2013.01)

(58) Field of Classification Search
CPC combination set(s) only.
See application file for complete search history.

(56) References Cited

U.S. PATENT DOCUMENTS

| | | | |
|---|---|---|---|
| 4,235,953 A | 11/1980 | Kumins et al. | |
| 4,818,787 A | 4/1989 | Sato et al. | |
| 11,649,350 B2 * | 5/2023 | Tibah | C08K 5/09 |
| | | | 52/506.01 |
| 2008/0005977 A1 | 1/2008 | Scardigno | |
| 2018/0022645 A1 | 1/2018 | Aerts et al. | |
| 2019/0047259 A1 | 2/2019 | Batenburg et al. | |

OTHER PUBLICATIONS

Arbain et al., "The effects of various acid catalyst on the esterification of jatropha curcas oil based trimethylolpropane ester as biolubricant base stock", E-Journal of Chemistry, 2011, vol. 8, No. S1, pp. S33-S40.

* cited by examiner

*Primary Examiner* — Ramsey Zacharia (74) *Attorney, Agent, or Firm* — Venable LLP (57) ABSTRACT

Some embodiments of the present disclosure relate to a method comprising obtaining a mixture comprising at least one vinyl polymer, at least one organic acid, and at least one hydronium ion donor. In some embodiments, the method comprises reacting an —OH group of the B polymer chain segment with the at least one organic acid in the presence of the at least one hydronium ion donor, so as to form at least one polyvinyl ester. Some embodiments of the present disclosure relate to a roofing material comprising at least one reinforcement material and at least one polyvinyl ester.

24 Claims, 3 Drawing Sheets

POLYVINYL ESTER FORMULATIONS, METHODS OF MAKING THE SAME ROOFING MATERIALS AND ROOFING SYSTEMS INCLUDING THE SAME

This application is a continuation of U.S. patent application Ser. No. 17/577,928, filed Jan. 18, 2022, which claims the priority of U.S. Provisional Application No. 63/139,058, filed Jan. 19, 2021, which are incorporated herein by reference in their entireties for all purposes.

FIELD

The present disclosure relates to polyvinyl ester formulations, methods of making the polyvinyl ester formulations, and roofing materials including the polyvinyl ester formulations.

BACKGROUND

Many existing polymers, such as thermoplastic polymers, can be expensive. There is a need for polymers that are less expensive and that can be produced in a single plant. There is also a need to utilize recycled polymers.

SUMMARY

Some embodiments of the present disclosure relate to a method comprising:
  obtaining a mixture,
    wherein the mixture comprises:
      at least one vinyl polymer,
        wherein the at least one vinyl polymer comprises the following polymer chain segments:

at least one organic acid, and
      at least one hydronium ion donor; and
    reacting the —OH group of the B polymer chain segment with the at least one organic acid in the presence of the at least one hydronium ion donor, so as to form at least one polyvinyl ester,
      wherein the at least one polyvinyl ester comprises the following polymer chain segments:

-continued wherein R is an ester group.

Some embodiments of the present disclosure relate to a roofing material comprising:
  at least one reinforcement material; and
  at least one polyvinyl ester,
    wherein the at least one polyvinyl ester is interspersed with the at least one reinforcement material,
    wherein the at least one polyvinyl ester comprises the following polymer chain segments:

wherein R is an ester group; and
  wherein:
    the roofing material exhibits an elongation of 50% to 500% based on ASTM D828,
    the roofing material exhibits a tensile strength of 35 lbf to 130 lbf, based on ASTM D828,
    the roofing material exhibits a tear of 500 gf to 2500 gf, based on ASTM D1922, or
    any combination thereof.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

Some embodiments of the present disclosure relate to a method of forming a polyvinyl ester.

In some embodiments, the method comprises obtaining a mixture. In some embodiments, the mixture comprises at least one vinyl polymer. In some embodiments, the at least one polymer is polyvinyl butyral. In some embodiments, the at least one vinyl polymer, which may be polyvinyl butyral, comprises, consists of, or consists essentially of the following polymer chain segments:

In some embodiments, the at least one vinyl polymer comprises, or is selected from the group consisting of polyethylene, polypropylene, polystyrene, polyvinyl chloride (PVC), polyvinyl alcohol (PVA), polyvinyl acetate (PVAc), Polyacrylonitrile (PVAN), or any combination thereof.

In some embodiments, the at least one vinyl polymer is present in the mixture an amount of 30 wt % to 90 wt % based on a total weight of the mixture. In some embodiments, the at least one vinyl polymer is present in the mixture an amount of 40 wt % to 90 wt % based on a total weight of the mixture. In some embodiments, the at least one vinyl polymer is present in the mixture an amount of 50 wt % to 90 wt % based on a total weight of the mixture. In some embodiments, the at least one vinyl polymer is present in the mixture an amount of 60 wt % to 90 wt % based on a total weight of the mixture. In some embodiments, the at least one vinyl polymer is present in the mixture an amount of 70 wt % to 90 wt % based on a total weight of the mixture. In some embodiments, the at least one vinyl polymer is present in the mixture an amount of 80 wt % to 90 wt % based on a total weight of the mixture.

In some embodiments, the at least one vinyl polymer is present in the mixture an amount of 30 wt % to 80 wt % based on a total weight of the mixture. In some embodiments, the at least one vinyl polymer is present in the mixture an amount of 30 wt % to 70 wt % based on a total weight of the mixture. In some embodiments, the at least one vinyl polymer is present in the mixture an amount of 30 wt % to 80 wt % based on a total weight of the mixture. In some embodiments, the at least one vinyl polymer is present in the mixture an amount of 30 wt % to 80 wt % based on a total weight of the mixture. In some embodiments, the at least one vinyl polymer is present in the mixture an amount of 30 wt % to 80 wt % based on a total weight of the mixture.

In some embodiments, the at least one vinyl polymer is present in the mixture an amount of 40 wt % to 80 wt % based on a total weight of the mixture. In some embodiments, the at least one vinyl polymer is present in the mixture an amount of 50 wt % to 70 wt % based on a total weight of the mixture.

In some embodiments, the mixture further comprises at least one organic acid.

In some embodiments, the at least one organic acid is present in an amount of 5 wt % to 60 wt % based on a total weight of the mixture. In some embodiments, the at least one organic acid is present in an amount of 15 wt % to 60 wt % based on a total weight of the mixture. In some embodiments, the at least one organic acid is present in an amount of 30 wt % to 60 wt % based on a total weight of the mixture. In some embodiments, the at least one organic acid is present in an amount of 45 wt % to 60 wt % based on a total weight of the mixture.

In some embodiments, the at least one organic acid is present in an amount of 5 wt % to 45 wt % based on a total weight of the mixture. In some embodiments, the at least one organic acid is present in an amount of 5 wt % to 30 wt % based on a total weight of the mixture. In some embodiments, the at least one organic acid is present in an amount of 5 wt % to 15 wt % based on a total weight of the mixture.

In some embodiments, the at least one organic acid is present in an amount of 15 wt % to 45 wt % based on a total weight of the mixture.

In some embodiments, the at least one organic acid comprises or is selected from the group consisting of a carboxylic acid, a fatty acid, or any combination thereof. In some embodiments, the carboxylic acid comprises or is selected from the group consisting of lactic acid, formic acid, acetic acid, citric acid, oxalic acid, malic acid, tartaric acid, acid anhydride, or any combination thereof. In some embodiments, the at least one organic acid comprises, consists of, or consists essentially of a fatty acid. In some embodiments, the fatty acid comprises or is selected from the group consisting of a saturated fatty acid, an unsaturated fatty acid, or any combination thereof. In some embodiments, the saturated fatty acid comprises or is selected from the group consisting of caprylic acid, capric acid, lauric acid, myristic acid, palmitic acid, stearic acid, arachidic acid, behenic acid, lignoceric acid, cerotic acid, or any combination thereof. In some embodiments, the unsaturated fatty acid comprises or is selected from the group consisting of myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, or any combination thereof. In some embodiments, the unsaturated fatty acid comprises, consists, or consists essentially of oleic acid.

In some embodiments, the mixture further comprises at least one hydronium ion donor.

In some embodiments, the at least one hydronium ion donor is present in an amount of 0.1 wt % to 10 wt % based on a total weight of the mixture. In some embodiments, the at least one hydronium ion donor is present in an amount of 1 wt % to 10 wt % based on a total weight of the mixture. In some embodiments, the at least one hydronium ion donor is present in an amount of 2 wt % to 10 wt % based on a total weight of the mixture. In some embodiments, the at least one hydronium ion donor is present in an amount of 5 wt % to 10 wt % based on a total weight of the mixture. In some embodiments, the at least one hydronium ion donor is present in an amount of 9 wt % to 10 wt % based on a total weight of the mixture.

In some embodiments, the at least one hydronium ion donor is present in an amount of 0.1 wt % to 9 wt % based on a total weight of the mixture. In some embodiments, the at least one hydronium ion donor is present in an amount of 0.1 wt % to 5 wt % based on a total weight of the mixture. In some embodiments, the at least one hydronium ion donor is present in an amount of 0.1 wt % to 2 wt % based on a total weight of the mixture. In some embodiments, the at least one hydronium ion donor is present in an amount of 0.1 wt % to 1 wt % based on a total weight of the mixture.

In some embodiments, the at least one hydronium ion donor is present in an amount of 1 wt % to 9 wt % based on a total weight of the mixture. In some embodiments, the at least one hydronium ion donor is present in an amount of 2 wt % to 5 wt % based on a total weight of the mixture.

In some embodiments, the at least one hydronium ion donor comprises or is selected from the group consisting of water, an acid, an aqueous solution, an alcohol, or any combination thereof. In some embodiments, the acid comprises an inorganic acid. In some embodiments, the inorganic acid comprises or is selected from the group consisting of hydrochloric acid, nitric acid, phosphoric acid, sulfuric acid, hydrobromic acid, boric acid, hydrofluoric acid, perchloric acid, hydroiodic acid or any combination thereof. In some embodiments, the aqueous solution is a salt solution. In some embodiments, the salt solution comprises alkaline metal ions, alkaline earth metal ions, transition metal ions, ammonium ions, halide ions, carbonate ions, nitrate ions, nitrite ions, phosphate ions, sulfate ions, or any combination thereof. In some embodiments, the alcohol comprises methanol, ethanol, butanol, isopropyl alcohol, or any combination thereof. In some embodiments, the at least one hydronium ion donor comprises, consists of, or consists essentially of water. In some embodiments, the at least one hydronium ion donor comprises a mixture of water and alcohol.

In some embodiments, the mixture is an emulsion. In some embodiments, the mixture is a suspension, a solution, a dispersion, a colloid, any other mixture, or any combination thereof.

Figure 1:
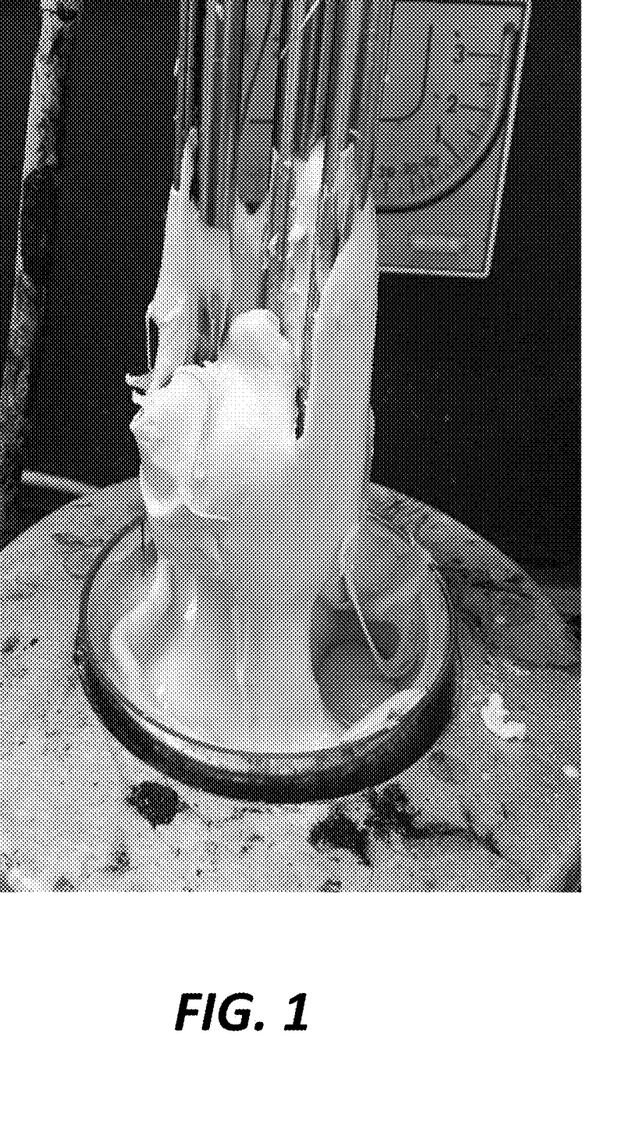
FIG. 1 is a photograph depicting a non-limiting example of at least one polyvinyl ester according to some embodiments of the present disclosure.

In some embodiments, the method comprises reacting the —OH group of the B polymer chain segment with the at least one organic acid in the presence of the at least one hydronium ion donor. In some embodiments, the reacting of the —OH group of the B polymer chain segment with the at least one organic acid in the presence of the at least one hydronium ion donor results in formation of at least one polyvinyl ester as described herein. A photograph depicting a non-limiting example of at least one polyvinyl ester according to some embodiments of the present disclosure is shown in FIG. 1.

In some embodiments, the at least one hydronium donor or water is added to the mixture during the reacting of the —OH group of the B polymer chain segment with the at least one organic acid in the presence of the at least one hydronium ion donor.

In some embodiments, the reacting of the —OH group of the B polymer chain segment with the at least one organic acid in the presence of the at least one hydronium ion donor is performed at a temperature of 0° C. to 100° C. In some embodiments, the reacting of the —OH group of the B polymer chain segment with the at least one organic acid in the presence of the at least one hydronium ion donor is performed at a temperature of 10° C. to 100° C. In some embodiments, the reacting of the —OH group of the B polymer chain segment with the at least one organic acid in the presence of the at least one hydronium ion donor is performed at a temperature of 20° C. to 100° C. In some embodiments, the reacting of the —OH group of the B polymer chain segment with the at least one organic acid in the presence of the at least one hydronium ion donor is performed at a temperature of 30° C. to 100° C. In some embodiments, the reacting of the —OH group of the B polymer chain segment with the at least one organic acid in the presence of the at least one hydronium ion donor is performed at a temperature of 40° C. to 100° C. In some embodiments, the reacting of the —OH group of the B polymer chain segment with the at least one organic acid in the presence of the at least one hydronium ion donor is performed at a temperature of 50° C. to 100° C. In some embodiments, the reacting of the —OH group of the B polymer chain segment with the at least one organic acid in the presence of the at least one hydronium ion donor is performed at a temperature of 60° C. to 100° C. In some embodiments, the reacting of the —OH group of the B polymer chain segment with the at least one organic acid in the presence of the at least one hydronium ion donor is performed at a temperature of 70° C. to 100° C. In some embodiments, the reacting of the —OH group of the B polymer chain segment with the at least one organic acid in the presence of the at least one hydronium ion donor is performed at a temperature of 80° C. to 100° C. In some embodiments, the reacting of the —OH group of the B polymer chain segment with the at least one organic acid in the presence of the at least one hydronium ion donor is performed at a temperature of 90° C. to 100° C.

In some embodiments, the reacting of the —OH group of the B polymer chain segment with the at least one organic acid in the presence of the at least one hydronium ion donor is performed at a temperature of 0° C. to 90° C. In some embodiments, the reacting of the —OH group of the B polymer chain segment with the at least one organic acid in the presence of the at least one hydronium ion donor is performed at a temperature of 0° C. to 80° C. In some embodiments, the reacting of the —OH group of the B polymer chain segment with the at least one organic acid in the presence of the at least one hydronium ion donor is performed at a temperature of 0° C. to 70° C. In some embodiments, the reacting of the —OH group of the B polymer chain segment with the at least one organic acid in the presence of the at least one hydronium ion donor is performed at a temperature of 0° C. to 60° C. In some embodiments, the reacting of the —OH group of the B polymer chain segment with the at least one organic acid in the presence of the at least one hydronium ion donor is performed at a temperature of 0° C. to 50° C. In some embodiments, the reacting of the —OH group of the B polymer chain segment with the at least one organic acid in the presence of the at least one hydronium ion donor is performed at a temperature of 0° C. to 40° C. In some embodiments, the reacting of the —OH group of the B polymer chain segment with the at least one organic acid in the presence of the at least one hydronium ion donor is performed at a temperature of 0° C. to 30° C. In some embodiments, the reacting of the —OH group of the B polymer chain segment with the at least one organic acid in the presence of the at least one hydronium ion donor is performed at a temperature of 0° C. to 20° C. In some embodiments, the reacting of the —OH group of the B polymer chain segment with the at least one organic acid in the presence of the at least one hydronium ion donor is performed at a temperature of 0° C. to 10° C.

In some embodiments, the reacting of the —OH group of the B polymer chain segment with the at least one organic acid in the presence of the at least one hydronium ion donor is performed at a temperature of 10° C. to 90° C. In some embodiments, the reacting of the —OH group of the B polymer chain segment with the at least one organic acid in the presence of the at least one hydronium ion donor is performed at a temperature of 20° C. to 80° C. In some embodiments, the reacting of the —OH group of the B polymer chain segment with the at least one organic acid in the presence of the at least one hydronium ion donor is performed at a temperature of 30° C. to 70° C. In some embodiments, the reacting of the —OH group of the B polymer chain segment with the at least one organic acid in the presence of the at least one hydronium ion donor is performed at a temperature of 40° C. to 60° C.

In some embodiments, the reacting of the —OH group of the B polymer chain segment with the at least one organic acid in the presence of the at least one hydronium ion donor is performed at a pressure of 10 kPa to 1000 kPa. In some embodiments, the reacting of the —OH group of the B polymer chain segment with the at least one organic acid in the presence of the at least one hydronium ion donor is performed at a pressure of 50 kPa to 1000 kPa. In some embodiments, the reacting of the —OH group of the B polymer chain segment with the at least one organic acid in the presence of the at least one hydronium ion donor is performed at a pressure of 100 kPa to 1000 kPa. In some embodiments, the reacting of the —OH group of the B polymer chain segment with the at least one organic acid in the presence of the at least one hydronium ion donor is performed at a pressure of 500 kPa to 1000 kPa.

In some embodiments, the reacting of the —OH group of the B polymer chain segment with the at least one organic acid in the presence of the at least one hydronium ion donor is performed at a pressure of 10 kPa to 500 kPa. In some embodiments, the reacting of the —OH group of the B polymer chain segment with the at least one organic acid in the presence of the at least one hydronium ion donor is performed at a pressure of 10 kPa to 100 kPa. In some embodiments, the reacting of the —OH group of the B polymer chain segment with the at least one organic acid in the presence of the at least one hydronium ion donor is performed at a pressure of 10 kPa to 50 kPa.

In some embodiments, the reacting of the —OH group of the B polymer chain segment with the at least one organic acid in the presence of the at least one hydronium ion donor is performed at a pressure of 100 kPa to 500 kPa.

Figure 2:
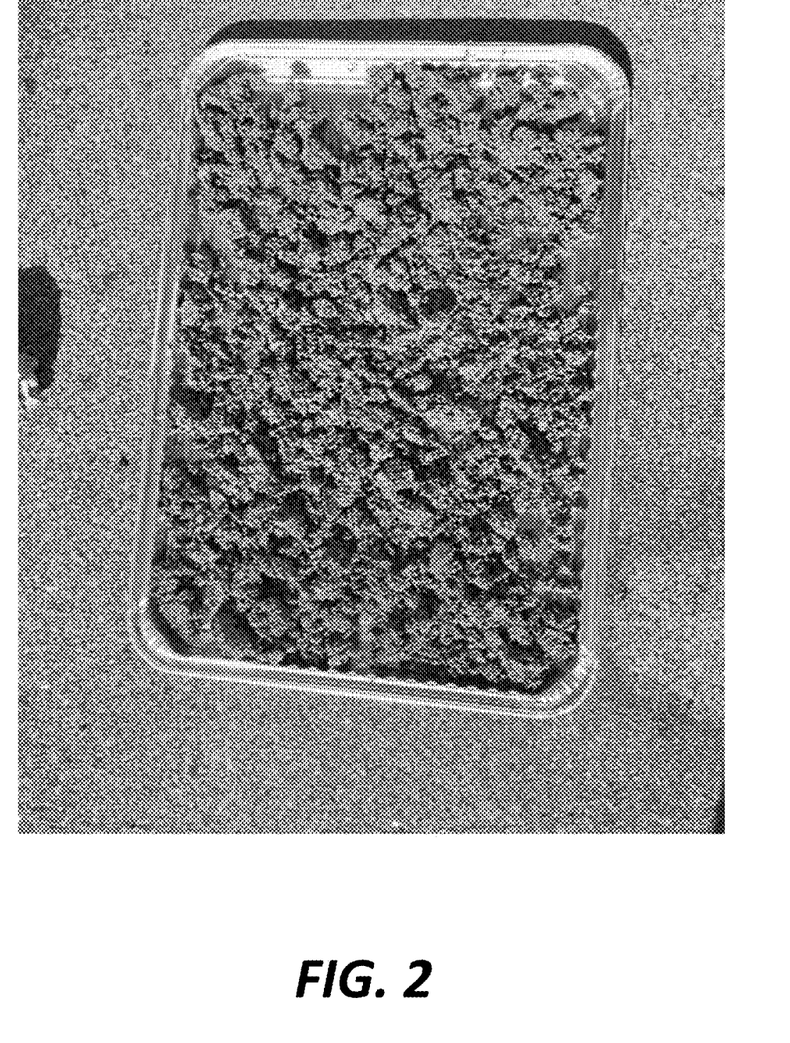
FIG. 2 is a photograph depicting a non-limiting example of at least one polyvinyl ester mixed with at least one reinforcement material according to some embodiments of the present disclosure.

In some embodiments, the method further comprises a step of adding at least one reinforcement material to the mixture. In some embodiments, the at least one reinforcement material is added to the mixture prior to reacting of the —OH group of the B polymer chain segment with the at least one organic acid in the presence of the at least one hydronium ion donor. In some embodiments, the at least one reinforcement material is present in the mixture during the step of obtaining the mixture. A photograph depicting a non-limiting example of at least one polyvinyl ester mixed with at least one reinforcement material according to some embodiments of the present disclosure is shown in FIG. 2.

In some embodiments, the at least one reinforcement material is present in an amount of 1 wt % to 50 wt % based on a total weight of the mixture. In some embodiments, the at least one reinforcement material is present in an amount of 10 wt % to 50 wt % based on a total weight of the mixture. In some embodiments, the at least one reinforcement material is present in an amount of 20 wt % to 50 wt % based on a total weight of the mixture. In some embodiments, the at least one reinforcement material is present in an amount of 30 wt % to 50 wt % based on a total weight of the mixture. In some embodiments, the at least one reinforcement material is present in an amount of 40 wt % to 50 wt % based on a total weight of the mixture.

In some embodiments, the at least one reinforcement material is present in an amount of 1 wt % to 40 wt % based on a total weight of the mixture. In some embodiments, the at least one reinforcement material is present in an amount of 1 wt % to 30 wt % based on a total weight of the mixture. In some embodiments, the at least one reinforcement material is present in an amount of 1 wt % to 20 wt % based on a total weight of the mixture. In some embodiments, the at least one reinforcement material is present in an amount of 1 wt % to 10 wt % based on a total weight of the mixture.

In some embodiments, the at least one reinforcement material is present in an amount of 10 wt % to 40 wt % based on a total weight of the mixture. In some embodiments, the at least one reinforcement material is present in an amount of 20 wt % to 30 wt % based on a total weight of the mixture.

In some embodiments, the at least one reinforcement material comprises or is selected from the group consisting of ground tire rubber, asphalt shingle waste, at least one organic filler, at least one mineral filler, at least one antioxidant, at least one fire retardant, or any combination thereof. In some embodiments, the at least one mineral filler comprises, consists of, or consists essentially of perlite. In some embodiments, the at least one reinforcement material comprises, consists of, or consists essentially of asphalt shingle waste.

In some embodiments, the mixture has a viscosity of 5 cP to 300,000 cP at a temperature of 0° C. to 100° C. during the reacting of the —OH group of the B polymer chain segment with the at least one organic acid in the presence of the at least one hydronium ion donor. In some embodiments, the mixture has a viscosity of 100 cP to 300,000 cP at the temperature of 0° C. to 100° C. during the reacting of the —OH group of the B polymer chain segment with the at least one organic acid in the presence of the at least one hydronium ion donor. In some embodiments, the mixture has a viscosity of 1000 cP to 300,000 cP at the temperature of 0° C. to 100 ° C. during the reacting of the —OH group of the B polymer chain segment with the at least one organic acid in the presence of the at least one hydronium ion donor. In some embodiments, the mixture has a viscosity of 10,000 cP to 300,000 cP at the temperature of 0° C. to 100° C. during the reacting of the —OH group of the B polymer chain segment with the at least one organic acid in the presence of the at least one hydronium ion donor. In some embodiments, the mixture has a viscosity of 100,000 cP to 300,000 cP at the temperature of 0° C. to 100° C. during the reacting of the —OH group of the B polymer chain segment with the at least one organic acid in the presence of the at least one hydronium ion donor. In some embodiments, the mixture has a viscosity of 100,000 cP to 300,000 cP at the temperature of 0° C. to 100° C. during the reacting of the —OH group of the B polymer chain segment with the at least one organic acid in the presence of the at least one hydronium ion donor. In some embodiments, the mixture has a viscosity of 200,000 cP to 300,000 cP at the temperature of 0° C. to 100° C. during the reacting of the —OH group of the B polymer chain segment with the at least one organic acid in the presence of the at least one hydronium ion donor.

In some embodiments, the mixture has a viscosity of 5 cP to 200,000 cP at a temperature of 0° C. to 100° C. during the reacting of the —OH group of the B polymer chain segment with the at least one organic acid in the presence of the at least one hydronium ion donor. In some embodiments, the mixture has a viscosity of 5 cP to 100,000 cP at a temperature of 0° C. to 100° C. during the reacting of the —OH group of the B polymer chain segment with the at least one organic acid in the presence of the at least one hydronium ion donor. In some embodiments, the mixture has a viscosity of 5 cP to 10,000 cP at a temperature of 0° C. to 100° C. during the reacting of the — OH group of the B polymer chain segment with the at least one organic acid in the presence of the at least one hydronium ion donor. In some embodiments, the mixture has a viscosity of 5 cP to 1000 cP at a temperature of 0° C. to 100° C. during the reacting of the —OH group of the B polymer chain segment with the at least one organic acid in the presence of the at least one hydronium ion donor. In some embodiments, the mixture has a viscosity of 5 cP to 100 cP at a temperature of 0° C. to 100° C. during the reacting of the —OH group of the B polymer chain segment with the at least one organic acid in the presence of the at least one hydronium ion donor.

In some embodiments, the mixture has a viscosity of 100 cP to 200,000 cP at a temperature of 0° C. to 100° C. during the reacting of the —OH group of the B polymer chain segment with the at least one organic acid in the presence of the at least one hydronium ion donor. In some embodiments, the mixture has a viscosity of 1000 cP to 100,000 cP at a temperature of 0° C. to 100° C. during the reacting of the —OH group of the B polymer chain segment with the at least one organic acid in the presence of the at least one hydronium ion donor.

In some embodiments, the at least one polyvinyl ester that results from the reacting of the —OH group of the B polymer chain segment with the at least one organic acid in the presence of the at least one hydronium ion donor, comprises the following polymer chain segments:

In some embodiments, R of the B' polymer chain segment, above, is an ester group. In some embodiments, the ester group R of the B' polymer chain segment is a conjugate ester of the at least one organic acid that is reacted with the —OH group of the B polymer chain segment, so as to form the at least one polyvinyl ester.

In some embodiments, the ester group R of the at least one polymer chain segment B' of the at least one polyvinyl ester comprises, consists of, or consists essentially of a carboxylate group. In some embodiments, the ester group R of the at least one polymer chain segment B' comprises or is selected from the group consisting of a lactate group, a formate group, an acetate group, a citrate group, an oxalate group, a maleate group, a tartrate group, or any combination thereof. In some embodiments, the ester group R of the at least one polymer chain segment B' comprises, consists of, or consists essentially of a fatty acid ester group. In some embodiments, the fatty acid ester group comprises, consists of, or consists essentially of an oleate group.

In some embodiments, after the step of reacting of the —OH group of the B polymer chain segment with the at least one organic acid in the presence of the at least one hydronium ion donor, so as to form the polyvinyl ester herein, the mixture comprising the polyvinyl ester is formed into at least one material, such as but not limited to at least one roofing material. In some embodiments, the at least one material formed from the mixture comprising the polyvinyl ester is a membrane, such as but not limited to a roofing membrane.

In some embodiments, after the step of reacting of the —OH group of the B polymer chain segment with the at least one organic acid in the presence of the at least one hydronium ion donor, so as to form the at least one polyvinyl ester herein, the mixture comprising the at least one polyvinyl ester is coated onto a substrate. In some embodiments, the mixture comprising at least one of the at least one polyvinyl ester, the at least one reinforcement material, or any combination thereof are coated onto a substrate. In some embodiments, the mixture comprising at least one of the at least one polyvinyl ester, the at least one reinforcement material, or any combination thereof are extruded onto a substrate. In some embodiments, the mixture comprising at least one of the at least one polyvinyl ester, the at least one reinforcement material, or any combination thereof are heat pressed onto a substrate. In some embodiments, the mixture comprising at least one of the at least one polyvinyl ester, the at least one reinforcement material, or any combination thereof are heat pressed to obtain a roofing material that does not comprise any substrate. In some embodiments, the mixture comprising at least one of the at least one polyvinyl ester, the at least one reinforcement material, or any combination thereof is dried (e.g., by at least one of disposing in an oven, contacting with heated air, exposing to ambient, or any combination thereof) prior to being coated, extruded, or heat pressed onto a substrate. In some embodiments, the substrate is a glass mat. In some embodiments, the substrate is a scrim.

Figure 3:
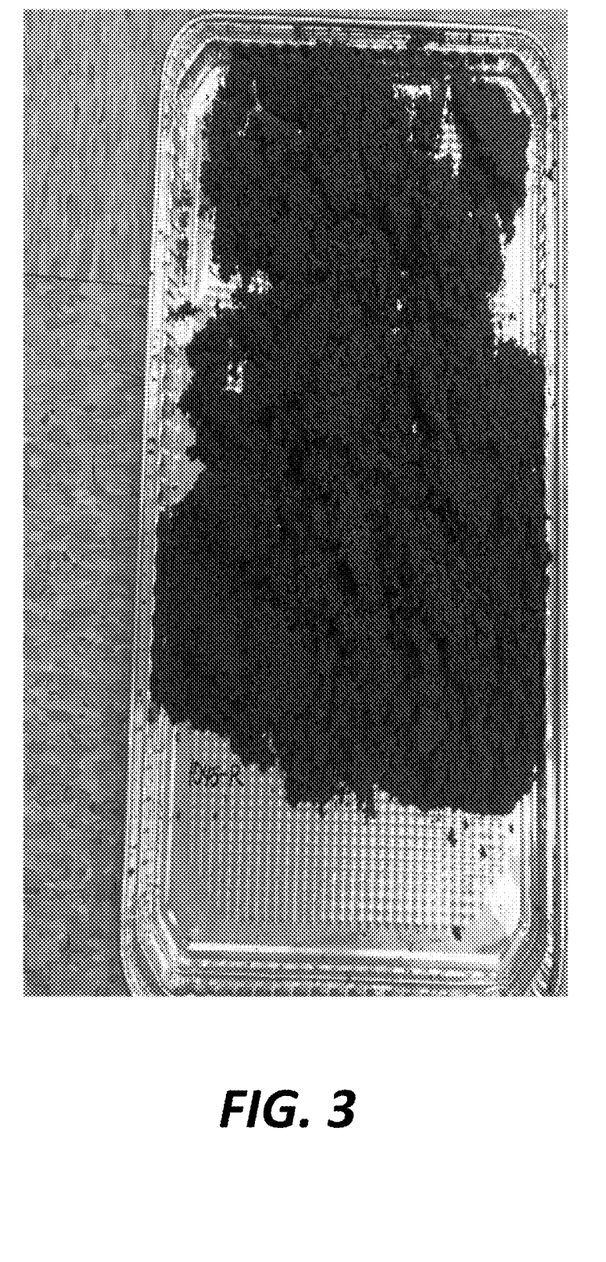
FIG. 3 is a photograph depicting a non-limiting example of a roofing material comprising at least one polyvinyl ester according to some embodiments of the present disclosure.

Some embodiments of the present disclosure relate to a roofing material. In some embodiments, the roofing material comprises the at least one reinforcement material described herein and the at least one polyvinyl ester described herein. A photograph depicting a non-limiting example of a roofing material comprising at least one polyvinyl ester according to some embodiments of the present disclosure is shown in FIG. 3.

In some embodiments, the at least one polyvinyl ester is interspersed with the at least one reinforcement material. As used herein, "the at least one polyvinyl ester is interspersed with the at least one reinforcement material" means that particles of the at least one polyvinyl ester may be scattered among particles of the at least one reinforcement material within the roofing material, that particles of the at least one reinforcement material may be scattered among particles of the at least one polyvinyl ester within the roofing material, or any combination thereof.

In some embodiments, the at least one polyvinyl ester is present in the roofing material in an amount of 50 wt % to 99 wt % based on a total weight of the roofing material. In some embodiments, the at least one polyvinyl ester is present in the roofing material in an amount of 30 wt % to 90 wt % based on a total weight of the roofing material. In some embodiments, the at least one polyvinyl ester is present in the roofing material in an amount of 40 wt % to 90 wt % based on a total weight of the roofing material. In some embodiments, the at least one polyvinyl ester is present in the roofing material in an amount of 50 wt % to 90 wt % based on a total weight of the roofing material. In some embodiments, the at least one polyvinyl ester is present in the roofing material in an amount of 60 wt % to 90 wt % based on a total weight of the roofing material. In some embodiments, the at least one polyvinyl ester is present in the roofing material in an amount of 70 wt % to 90 wt % based on a total weight of the roofing material. In some embodiments, the at least one polyvinyl ester is present in the roofing material in an amount of 80 wt % to 90 wt % based on a total weight of the roofing material.

In some embodiments, the at least one polyvinyl ester is present in the roofing material in an amount of 30 wt % to 80 wt % based on a total weight of the roofing material. In some embodiments, the at least one polyvinyl ester is present in the roofing material in an amount of 30 wt % to 70 wt % based on a total weight of the roofing material. In some embodiments, the at least one polyvinyl ester is present in the roofing material in an amount of 30 wt % to 80 wt % based on a total weight of the roofing material. In some embodiments, the at least one polyvinyl ester is present in the roofing material in an amount of 30 wt % to 80 wt % based on a total weight of the roofing material. In some embodiments, the at least one polyvinyl ester is present in the roofing material in an amount of 30 wt % to 80 wt % based on a total weight of the roofing material.

In some embodiments, the at least one polyvinyl ester is present in the roofing material in an amount of 40 wt % to 80 wt % based on a total weight of the roofing material. In some embodiments, the at least one polyvinyl ester is present in the roofing material in an amount of 50 wt % to 70 wt % based on a total weight of the roofing material.

In some embodiments, the at least one reinforcement material is present in an amount of 1 wt % to 50 wt % based on a total weight of the roofing material. In some embodiments, the at least one reinforcement material is present in an amount of 10 wt % to 50 wt % based on a total weight of the roofing material. In some embodiments, the at least one reinforcement material is present in an amount of 20 wt % to 50 wt % based on a total weight of the roofing material. In some embodiments, the at least one reinforcement material is present in an amount of 30 wt % to 50 wt % based on a total weight of the roofing material. In some embodiments, the at least one reinforcement material is present in an amount of 40 wt % to 50 wt % based on a total weight of the roofing material.

In some embodiments, the at least one reinforcement material is present in an amount of 1 wt % to 40 wt % based on a total weight of the roofing material. In some embodiments, the at least one reinforcement material is present in an amount of 1 wt % to 30 wt % based on a total weight of the roofing material. In some embodiments, the at least one reinforcement material is present in an amount of 1 wt % to 20 wt % based on a total weight of the roofing material. In some embodiments, the at least one reinforcement material is present in an amount of 1 wt % to 10 wt % based on a total weight of the roofing material.

In some embodiments, the at least one reinforcement material is present in an amount of 10 wt % to 40 wt % based on a total weight of the roofing material. In some embodiments, the at least one reinforcement material is present in an amount of 20 wt % to 30 wt % based on a total weight of the roofing material.

In some embodiments, the roofing material exhibits an elongation of 50% to 500% based on ASTM D828. In some embodiments, the roofing material exhibits an elongation of 100% to 500% based on ASTM D828. In some embodiments, the roofing material exhibits an elongation of 200% to 500% based on ASTM D828. In some embodiments, the roofing material exhibits an elongation of 300% to 500% based on ASTM D828. In some embodiments, the roofing material exhibits an elongation of 400% to 500% based on ASTM D828.

In some embodiments, the roofing material exhibits an elongation of 50% to 400% based on ASTM D828. In some embodiments, the roofing material exhibits an elongation of 50% to 300% based on ASTM D828. In some embodiments, the roofing material exhibits an elongation of 50% to 200% based on ASTM D828. In some embodiments, the roofing material exhibits an elongation of 50% to 100% based on ASTM D828.

In some embodiments, the roofing material exhibits an elongation of 100% to 400% based on ASTM D828. In some embodiments, the roofing material exhibits an elongation of 200% to 300% based on ASTM D2828.

In some embodiments, the roofing material exhibits a tensile strength of 35 lbs. force ("lbf") to 130 lbf, based on ASTM D828. In some embodiments, the roofing material exhibits a tensile strength of 50 lbf to 130 lbf, based on ASTM D828. In some embodiments, the roofing material exhibits a tensile strength of 100 lbf to 130 lbf, based on ASTM D828.

In some embodiments, the roofing material exhibits a tensile strength of 35 lbf to 100 lbf, based on ASTM D828. In some embodiments, the roofing material exhibits a tensile strength of 35 lbf to 50 lbf, based on ASTM D828.

In some embodiments, the roofing material exhibits a tensile strength of 50 lbf to 100 lbf, based on ASTM D828.

In some embodiments, the roofing material exhibits a tear of 500 grams force ("gf") to 2500 gf, based on ASTM D1922. In some embodiments, the roofing material exhibits a tear of 1000 gf to 2500 gf, based on ASTM D1922. In some embodiments, the roofing material exhibits a tear of 1500 gf to 2500 gf, based on ASTM D1922. In some embodiments, the roofing material exhibits a tear of 2000 gf to 2500 gf, based on ASTM D1922.

In some embodiments, the roofing material exhibits a tear of 500 gf to 2000 gf, based on ASTM D1922. In some embodiments, the roofing material exhibits a tear of 500 gf to 1500 gf, based on ASTM D1922. In some embodiments, the roofing material exhibits a tear of 500 gf to 1000 gf, based on ASTM D1922.

In some embodiments, the roofing material exhibits a tear of 1000 gf to 2000 gf, based on ASTM D1922.

In some embodiments, the roofing material further comprises a glass mat. In some embodiments, the roofing material further comprises a scrim. In some embodiments, the roofing material comprises a fiberglass mat, a polyester mat, or any combination thereof. In some embodiments, the roofing material is a roofing membrane. In some embodiments, the roofing material is a roofing shingle.

Some embodiments of the present disclosure relate to a roofing system. In some embodiments, the roofing system comprises at least one roof substrate and the roofing material described herein. In some embodiments, the roofing system comprises a roof substrate and a roofing material on the roof substrate. In some embodiments, the roofing system comprises a roof substrate and a coating on the substrate, wherein the coating comprises the roofing material.

In some embodiments, the at least one roof substrate comprises a first roof substrate, wherein roofing material is disposed on the first roof substrate. In some embodiments, the at least one roof substrate comprises a first roof substrate and a second roof substrate, wherein roofing material is disposed on between the first roof substrate and the second roof substrate.

In some embodiments, the first roof substrate, the second roof substrate, or any combination thereof, comprises, consists of, or consists essentially of a plywood roof substrate, a glass roof substrate, a cellulosic roof substrate, a roof deck, a photovoltaic (PV) panel, a modified bitumen (MODBIT) substrate, a roll good, a chimney, a polyisocyanurate (ISO) foam board, or any combination thereof.

EXAMPLES

Example 1

Several non-limiting samples of roofing materials were prepared. Exemplary ingredients used to prepare the roofing materials are shown below in Table 1 below.

TABLE 1

| Roofing Material Sample No. | PVB (wt. %) | H$_2$O (wt. %) | Oleic Acid (wt. %) | GTR (wt. %) | RAS (wt. %) | Perlite (wt. %) | Total (wt. %) |
|---|---|---|---|---|---|---|---|
| L | 79 | 1.5 | 19.5 | — | — | — | 100 |
| M | 48.5 | 1.5 | 50 | — | — | — | 100 |
| N | 64.5 | 1.5 | 17 | 17 | — | — | 100 |
| O | 56.5 | 0.5 | 13 | 17 | — | 13 | 100 |
| P | 40.5 | 0.5 | 6 | 13 | 40 | — | 100 |
| Q | 51 | 0.5 | 12 | 15 | 8.5 | 13 | 100 |
| C1 | Control: Asphalt filled coating | | | | | | |

PVB = Polyvinyl Butyral
GTR = Ground Tire rubber
RAS = Recycled Asphalt Shingles As shown in Table 1, Roofing Material Sample L of Table 1 was prepared using a mixture (a recycled solvent system) comprising at least one hydronium ion donor (a water and methanol (H$_2$O/MeOH) mixture). A vinyl polymer (polyvinyl butyral (PVB)) and an organic acid (oleic acid) were added to the mixture. The PVB and the oleic acid were reacted in the presence of the H$_2$/MeOH mixture so as to result in Roofing Material Sample L.

As further shown in Table 1, Roofing Material Samples M, N, O, P, Q of Table 1 were prepared using a mixture (a recycled water-based emulsion) where the at least one hydronium ion donor was water. The recycled water-based emulsion comprised recycled vinyl polymer (PVB). The recycled water-based emulsion was reacted with an organic acid (oleic acid) so as to result in Roofing Material Samples M, N, O, P, Q.

At least some the above samples (as shown in Table 1 above) included at least one reinforcement material in the form of at least one of recycled asphalt shingles (RAS), ground tire rubber (GTR), perlite, or any combination thereof. For at least some of the samples that utilized the GTR as a reinforcement material, the GTR was mixed with the oleic acid as powder before the GTR and the oleic acid were added to the mixture.

In at least some of the above samples (shown in Table 1 above), a portion of the oleic acid, a portion of a used water-based polymer dispersion, or both, were added to the mixture during the reaction.

As further shown in Table 1, Sample C1 was a comparative sample comprising air blown asphalt and at least one filler (i.e., filled air blown asphalt).

Example 2

Samples L, O, P, Q, and C1 from Example 1 were tested for Tensile Strength according to ASTM D828, Elongation according to ASTM D828, and Tear according to ASTM D1922. Results are shown below in Table 2.

TABLE 2

| Sample | Tensile Strength (lbs force "lbf") (ASTM D828) | Elongation at Peak load (%) (ASTM D828) | Tear (grams force "gf") |
|---|---|---|---|
| L | 113 | 380 | 1243 |
| O | 46 | 290 | 1300 |
| P | 55 | 267 | 1103 |
| Q | 41 | 260 | 1260 |
| C1 | 30 | 7 | 321 |

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing material comprising:
   at least one reinforcement material; and
   at least one polyvinyl ester,
   wherein the at least one polyvinyl ester is interspersed with the at least one reinforcement material,
   wherein the at least one polyvinyl ester comprises the following polymer chain segments:

wherein R is an ester group, and wherein the polymer chain segment B' is different from the polymer chain segment C.

2. The roofing material of claim 1, wherein the at least one reinforcement material is present in an amount of 1 wt % to 50 wt % based on a total weight of the roofing material, and wherein the at least one polyvinyl ester is present in an amount of 50 wt % to 99 wt % based on the total weight of the roofing material.

3. The roofing material of claim 1, wherein the at least one reinforcement material comprises at least one of ground tire rubber, asphalt shingle waste, at least one organic filler, at least one mineral filler, at least one antioxidant, at least one fire retardant, or any combination thereof.

4. The roofing material of claim 1, wherein the ester group of the polymer chain segment B' of the at least one polyvinyl ester is at least one of a carboxylate group, a fatty acid ester group, or any combination thereof.

5. The roofing material of claim 1, wherein the ester group of the polymer chain segment B' of the at least one polyvinyl ester is at least one of a lactate group, a formate group, a citrate group, an oxalate group, a maleate group, a tartrate group, an oleate group, or any combination thereof.

6. The roofing material of claim 1, further comprising a substrate, wherein the substrate comprises at least one of a fiberglass mat, a polyester mat, or any combination thereof.

7. A roofing system comprising:
   a roof substrate; and
   a roofing material on the roof substrate,
   wherein the roofing material comprises:
     at least one reinforcement material; and
     at least one polyvinyl ester,
     wherein the at least one polyvinyl ester is interspersed with the at least one reinforcement material,
     wherein the at least one polyvinyl ester comprises the following polymer chain segments:

wherein R is an ester group, and wherein the polymer chain segment B' is different from the polymer chain segment C.

8. The roofing system of claim 7, wherein the roof substrate comprises a roof deck.

9. The roofing system of claim 7, wherein the at least one reinforcement material is present in an amount of 1 wt % to 50 wt % based on a total weight of the roofing material, and wherein the at least one polyvinyl ester is present in an amount of 50 wt % to 99 wt % based on the total weight of the roofing material.

10. The roofing system of claim 7, wherein the at least one reinforcement material comprises at least one of ground tire rubber, asphalt shingle waste, at least one organic filler, at least one mineral filler, at least one antioxidant, at least one fire retardant, or any combination thereof.

11. The roofing system of claim 7, wherein the ester group of the polymer chain segment B' of the at least one polyvinyl ester is at least one of carboxylate group, a fatty acid ester group, or any combination thereof.

12. The roofing system of claim 7, wherein the ester group of the polymer chain segment B' of the at least one polyvinyl ester is at least one of a lactate group, a formate group, a citrate group, an oxalate group, a maleate group, a tartrate group, an oleate group, or any combination thereof.

13. The roofing system of claim 7, wherein the roofing material further comprises a substrate, wherein the substrate comprises at least one of a fiberglass mat, a polyester mat, or any combination thereof.

14. A method of making a roofing material:
(a) obtaining a mixture,
wherein the mixture comprises:
at least one vinyl polymer,
wherein the at least one vinyl polymer comprises the following polymer chain segments:

at least one organic acid, and
at least one hydronium ion donor; and
(b) reacting the —OH group of the B polymer chain segment with the at least one organic acid in the presence of the at least one hydronium ion donor, so as to form at least one polyvinyl ester,
wherein the at least one polyvinyl ester comprises the following polymer chain segments:

wherein R is an ester group, and wherein the polymer chain segment B' is different from the polymer chain segment C; and
wherein the at least one polyvinyl ester is interspersed with at least one reinforcement material.

15. The method of claim 14, wherein the at least one organic acid comprises at least one of a carboxylic acid, a fatty acid, or any combination thereof.

16. The method of claim 15,
wherein the carboxylic acid is at least one of lactic acid, formic acid, citric acid, oxalic acid, malic acid, tartaric acid, acid anhydride, or any combination thereof;
wherein the fatty acid is at least one of a saturated fatty acid, an unsaturated fatty acid, or any combination thereof.

17. The method of claim 16,
wherein the saturated fatty acid is at least one of caprylic acid, capric acid, lauric acid, myristic acid, palmitic acid, stearic acid, arachidic acid, behenic acid, lignoceric acid, cerotic acid, or any combination thereof;
wherein the unsaturated fatty acid is at least one of myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, or any combination thereof.

18. The method of claim 14, wherein the at least one hydronium ion donor comprises at least one of water, an acid, an aqueous solution, an alcohol, or any combination thereof.

19. The method of claim 18,
wherein the acid comprises at least one of hydrochloric acid, nitric acid, phosphoric acid, sulfuric acid, hydrobromic acid, boric acid, hydrofluoric acid, perchloric acid, hydroiodic acid, or any combination thereof;
wherein the aqueous solution is a salt solution comprising at least one of alkaline metal ions, alkaline earth metal ions, transition metal ions, ammonium ions, halide ions, carbonate ions, nitrate ions, nitrite ions, phosphate ions, sulfate ions, or any combination thereof;
wherein the alcohol is at least one of methanol, ethanol, butanol, isopropyl alcohol, or any combination thereof.

20. The method of claim 14, wherein the at least one vinyl polymer is present in the mixture an amount of 30 wt % to 90 wt % based on a total weight of the mixture.

21. The method of claim 14, wherein the at least one organic acid is present in an amount of 5 wt % to 60 wt % based on a total weight of the mixture.

22. The method of claim 14, wherein the at least one hydronium ion donor is present in an amount of 0.1 wt % to 10 wt % based on a total weight of the mixture.

23. The method of claim 14, further comprising (i) obtaining a substrate and (ii) applying the at least one polyvinyl ester onto the substrate, so as to form a roofing material.

24. The method of claim 23, wherein the substrate comprises at least one of a fiberglass mat, a polyester mat, or any combination thereof.

* * * * *